United States Patent
Bovina et al.

(10) Patent No.: US 6,382,042 B1
(45) Date of Patent: May 7, 2002

(54) UNIT FOR CONTROLLING THE SHAFT FOR SELECTION AND ENGAGEMENT OF THE GEARS OF A GEAR CHANGE

(75) Inventors: Luca Bovina, Casalecchio di Reno; Gianluigi Lenzi; Giovanni Lamberti, both of Bologna, all of (IT)

(73) Assignee: Magneti Marelli S.p.A., Milan (IT)

( * ) Notice: Subject to any disclaimer, the term of this patent is extended or adjusted under 35 U.S.C. 154(b) by 0 days.

(21) Appl. No.: 09/690,809

(22) Filed: Oct. 18, 2000

(30) Foreign Application Priority Data

Oct. 18, 1999 (IT) .......................... B099A0558

(51) Int. Cl.[7] .......................... F16H 59/00; B60K 20/00
(52) U.S. Cl. .................. 74/337.5; 74/473.3; 74/473.33
(58) Field of Search .......................... 74/473.3, 473.31, 74/473.32, 473.33, 473.34, 473.35, 337.5

(56) References Cited

U.S. PATENT DOCUMENTS

| 5,150,629 A | | 9/1992 | Morris et al. |
| 5,809,836 A | * | 9/1998 | Patzold et al. .............. 74/337.5 |
| 6,122,983 A | * | 9/2000 | Hoffman .................... 74/337.5 |

FOREIGN PATENT DOCUMENTS

DE 196 10 104 9/1997
EP 0 849 508 6/1998

* cited by examiner

*Primary Examiner*—David Fenstermacher
*Assistant Examiner*—Timothy McAnulty
(74) *Attorney, Agent, or Firm*—Venable; Gabor J. Kelemen

(57) ABSTRACT

Unit for controlling the shaft for selection and engagement of gears, provided with a control shaft, which can be connected to the said shaft for selection and engagement of the gears, with a device for movement, which can impart to the shaft angular movements which are designed to implement the passage between two angular engagement positions of gears which belong to a single row, and with a cam-guide device, which can modify the said angular displacements, selectively by command, into combined axial and angular displacements, such as to implement the change of gear between consecutive gears which belong to consecutive rows; the cam-guide device being axially mobile along the control shaft, between a plurality of row-change positions, at each of which it can guide the control shaft in the said combined angular and axial displacement, which can implement the passage of gear between two consecutive gears which belong to two consecutive rows; the cam-guide device also being able selectively to use the angular displacement of the control shaft during the passage of gear between two consecutive gears in a single row, in order to implement its own displacement along the control shaft, from one row-change position to the one which is adjacent, such as to be ready to implement a successive change of row.

8 Claims, 4 Drawing Sheets

UNIT FOR CONTROLLING THE SHAFT FOR SELECTION AND ENGAGEMENT OF THE GEARS OF A GEAR CHANGE

The present invention relates to a unit for controlling the shaft for selection and engagement of the gears of a gear change.

In particular, the present invention relates to a unit for controlling the shaft for selection and engagement of the gears of a gear change of the mechanical type in the shape of an "H", with selection of the gears by means of axial displacements and engagement of the gears by means of angular displacements, and which is suitable in particular for being fitted onto vehicles which have transverse transmission.

BACKGROUND OF THE INVENTION

As is known, gear changes which are currently in use for vehicles comprise a gear box, from which there projects at least one shaft for selection and engagement of the gears, by means of which the driver of the vehicle can select and engage the required gear. In the most common gear changes, the gears are selected and engaged by making the shaft for selection and engagement of the gears undergo a combination of rotations and axial displacements, which define gear changes of the mechanical type in the shape of an "H". With reference to FIG. 1, the positions of engagement of the gears are in fact disposed according to a configuration in the shape of a double "H", in which the gears are subdivided into groups of two (for example 1–2, 3–4 and 5–R), which are commonly known as "crows", such that, from a reference position which is normally located in the centre of the double "H", the "row" is selected by means of axial displacement of the shaft for selection and engagement itself, and the gears are engaged by means of angular displacement of the shaft for selection and engagement itself.

The devices which are currently in use for controlling the shaft for selection and engagement substantially comprise a control shaft which can be connected to the shaft for selection and engagement of the gears of the gear change, and a pair of actuators, which are connected to the control shaft, such as to be able to rotate the latter and displace it axially.

In particular, if the row is selected by means of axial displacements of the shaft for selection and engagement of the gears, the linear actuator which controls the axial displacement of the control shaft can make the control shaft assume three different axial positions (four in the case of a gear change with six gears plus reverse), to each of which there corresponds selection of a row, whereas the actuator which controls the angular displacement of the control shaft can make the control shaft assume three different angular positions, to each of which there corresponds engagement of a gear or the neutral position.

The said actuators are normally actuated pneumatically, hydraulically or electrically, and are controlled by an electronic control system.

Control units with two linear actuators have the major disadvantage that they required relatively complex components, such as hydraulic actuators which have several positions, valves, units for regulation of the paths, and position transducers, which increase the production cost of the unit. In particular, since linear actuators with several positions, which displace the control shaft axially in order to implement selection of the rows, need to be very accurate in positioning the control shaft, this requires mechanical processing and technical solutions which are highly specialised, which make the unit particularly expensive to produce.

SUMMARY OF THE INVENTION

The object of the present invention is thus to provide a unit for controlling the shaft for selection and engagement of the gears, which is more economical and simple to produce than those which are known at present.

According to the present invention, a unit is provided for controlling the shaft for selection and engagement of the gears of a gear change, wherein the shaft for selection and engagement of the gears is mobile, after axial displacements and/or rotations have taken place, between a plurality of gear engagement positions, to each of which there corresponds engagement of a gear or of the neutral position; the positions of engagement of the gear being disposed according to a selection grid in the shape of an "H" in which the gears are distributed in rows of two; the control unit comprising:

an outer housing;

a control unit which is fitted on the said housing, such as to be able to rotate angularly around its own axis, in order to implement a manoeuvre of engagement/release of the gears, and is axially mobile along its own axis, in order to implement a manoeuvre of selection of the row of gears; for each row of gears the said control shaft also being able to assume three different angular positions, corresponding respectively to a neutral angular position and two angular positions for engagement of the gear;

movement means, which are designed to displace the said control shaft angularly around its own longitudinal axis, between the said three different angular positions; and cam guide means, which are connected mechanically to the said control shaft, and which, during the angular displacement of the control shaft which implements the passage between the two angular positions of engagement of gears in a row, are designed to impart selectively to the control shaft itself axial displacement which is sufficient to implement the passage to the row which is immediately adjacent, such as to implement the passage between consecutive gears which belong to consecutive rows;

the control means being characterised in that the said cam guide means are axially mobile along the control shaft, between a plurality of row-change positions, at each of which it can guide the control shaft in the said combined angular and axial displacement, which is sufficient to transform the passage of gear between two gears which belong to a single row, into a passage of gear between two consecutive gears which belong to two consecutive rows.

BRIEF DESCRIPTION OF THE DRAWINGS

The present invention will now be described with reference to the attached drawings, which illustrate a non-limiting embodiment of it, in which.

DETAILED DESCRIPTION OF THE INVENTION

With reference to the attached figures, 1 indicates as a whole a unit for controlling the shaft 2 for selection and engagement of the gears of a mechanical gear change 3, of the type with a selection grid in the shape of an "H", which is normally fitted on motor vehicles and the like.

Figure 1:
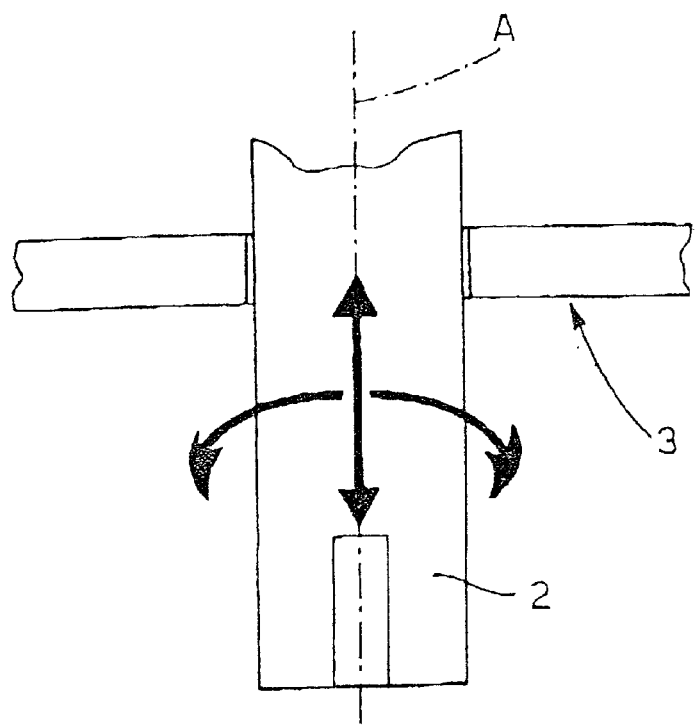
FIG. 1 illustrates schematically a possible grid for engagement of the gears of a gear change in the shape of an "H" in relation to the shaft for selection and engagement of the gears of the gear change itself.
Figure 1:
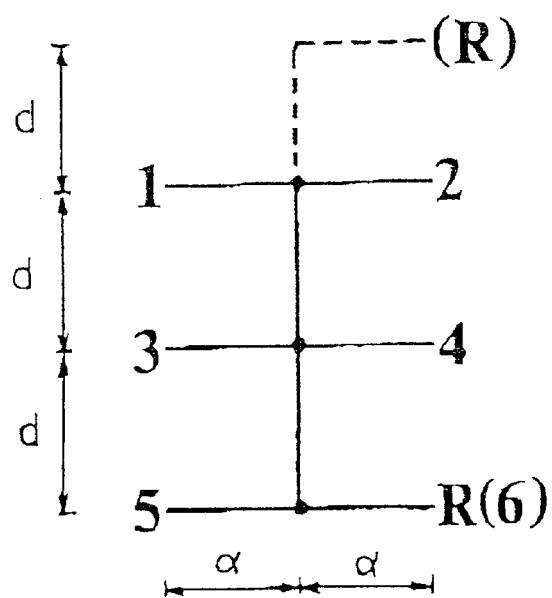

With reference to FIG. 1, in particular the control unit 1 can impart by command to the shaft 2 for selection and engagement of the gears, which projects from the gear box 3, pre-determined axial and/or angular displacements, such as to be able to implement by command the passage from one gear to the next. The shaft 2 for selection and engagement of the gears of a mechanical gear change 3 in the shape of an "H" is in fact mobile between a plurality of gear engagement positions, which are disposed according to a selection grid in the shape of a double "H", of the type illustrated in FIG. 1.

In this case, the positions of engagement of the gears are arranged according to a configuration in the shape of a double "H", in which the gears are subdivided into groups of two (for example 1–2, 3–4 and 5–R), which are commonly known as "rows" such that, from a reference position which is normally located in the centre of the double "H", the "row", is selected by means of axial displacement of the shaft 2 for selection and engagement itself, and the gears are engaged by means of angular displacement of the shaft 2 for selection and engagement itself.

It should be emphasised that a mechanical gear change in the shape of an "H" can also be provided with two or more shafts 2 for selection and engagement of the gears: in this case the selection grid will be different, but the passage from one gear to the other will still take place by imparting pre-determined axial and/or angular displacement to at least one of the shafts 2 for selection and engagement.

Figure 2:
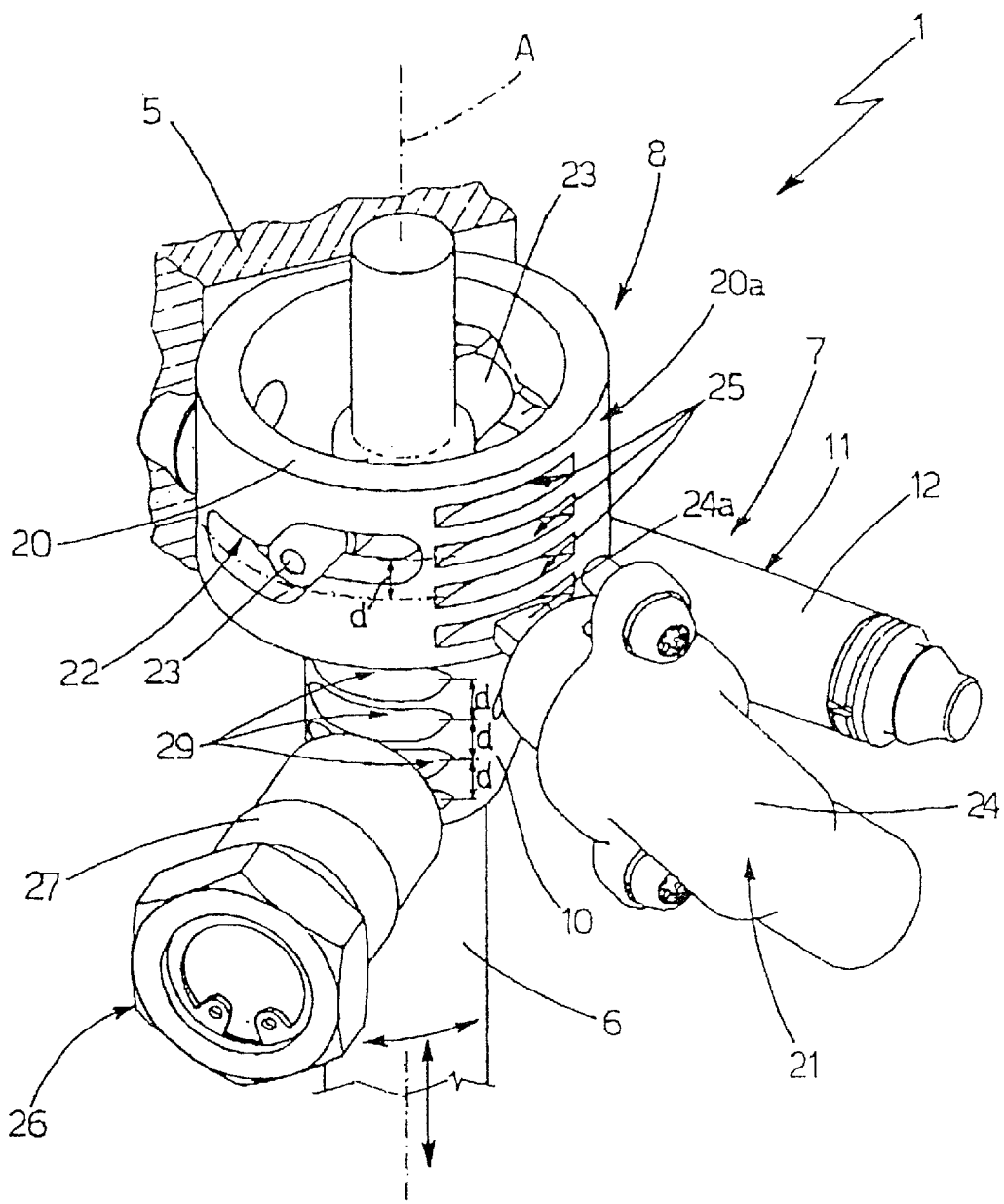
FIG. 2 is a first perspective view, with parts removed for the sake of clarity, of a unit for controlling the shaft for selection and engagement of the gears of a gear change produced according to the dictates of the present invention.
Figure 3:
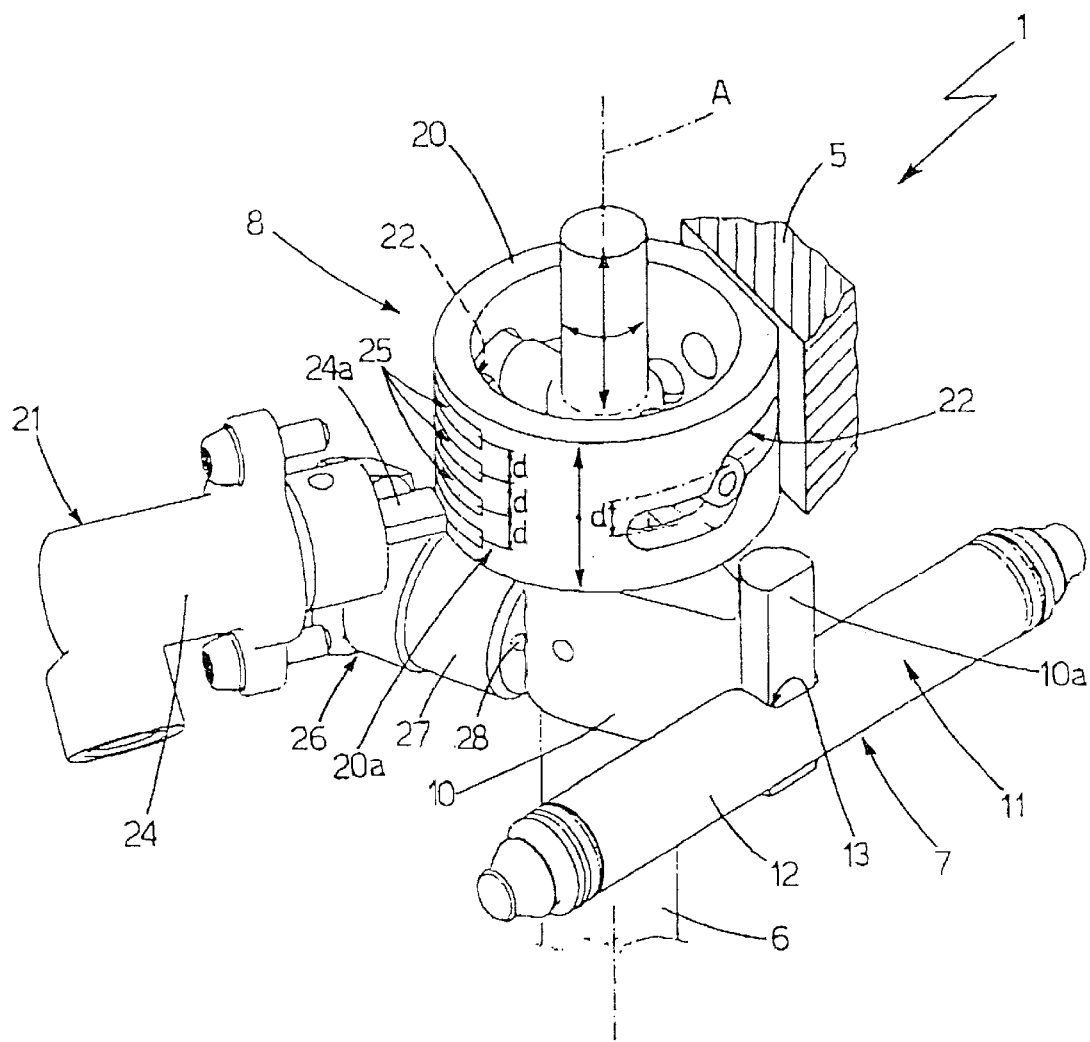
FIG. 3 is a second perspective view, with parts removed for the sake of clarity, of the unit for controlling the shaft for selection and engagement of the gears illustrated in FIG. 2.
Figure 4:
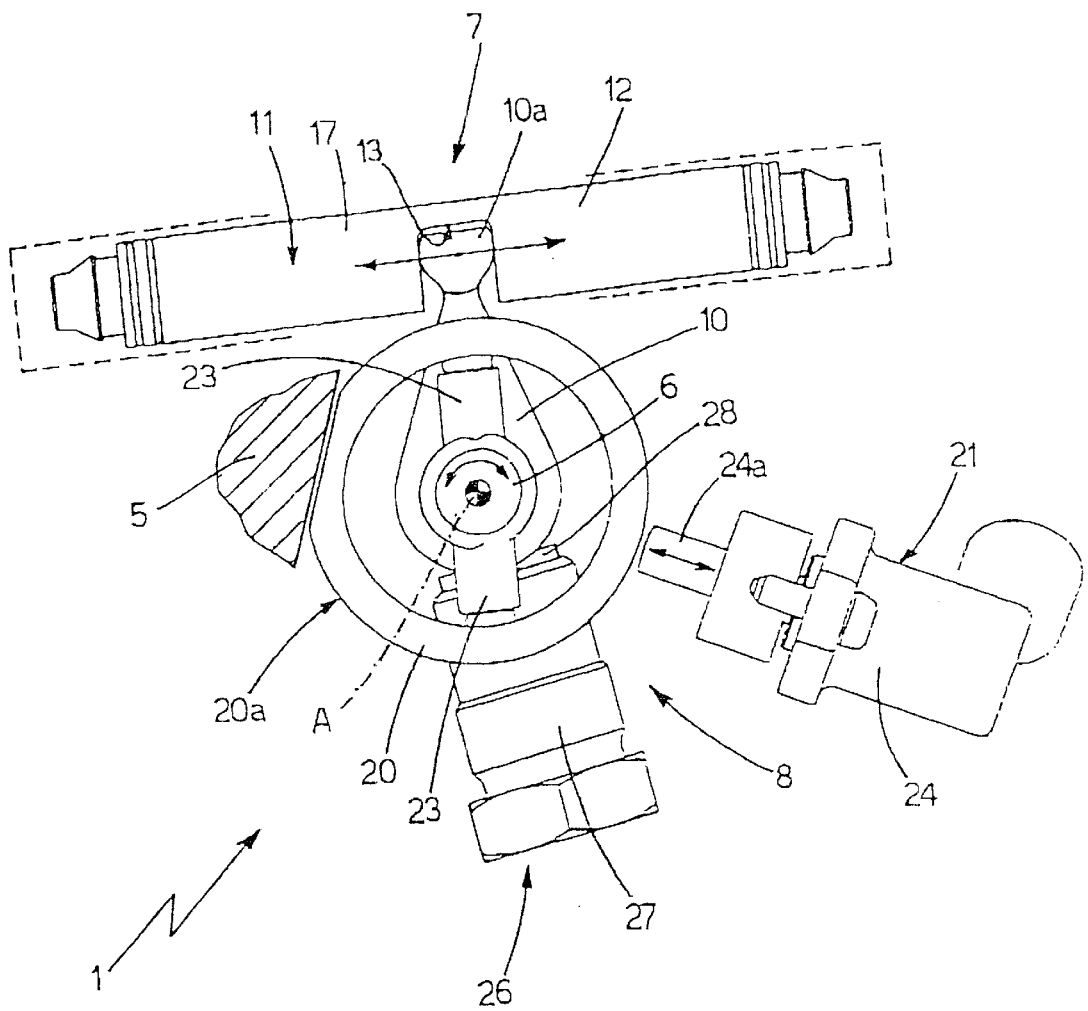
FIG. 4 is a plan view, with parts removed for the sake of clarity, of the unit for controlling the shaft for selection and engagement of the gears illustrated in FIGS. 2 and 3.

With reference to FIGS. 2, 3 and 4, the control unit 1 comprises an outer housing 5 (which is only partially illustrated in the attached figures); a control shaft 6, which is fitted such as to rotate angularly, and is axially mobile inside the housing 5; and a movement device 7 of a known type, which can rotate the control shaft 6 by command around its longitudinal axis A, in a clockwise or anti-clockwise direction.

In addition to the control shaft 6, the housing 5 also accommodates the movement device 7, and can be fitted on the gear change 3 such that the control shaft 6 is aligned with the shaft 2 for selection and engagement of the gears of the gear change; whereas one end of the control shaft 6 can be connected to the shaft 2 for selection and engagement of the gears of the gear change 3 by means of a mechanical coupling of a known type (not illustrated), such as to transmit the axial and angular displacements which are imparted to the control shaft 6, to the shaft 2 for selection and engagement of the gear change 3. According to a different embodiment, the control shaft 6 of the control unit 1 consists of an end portion of the shaft 2 for selection and engagement of the gear change 3, and in this case the housing 5 can be incorporated in the gear box 3.

The movement device 7 can move the control shaft 6 by command between three different angular positions, which in the example illustrated are angularly spaced by a pre-determined angle a, to each of which there corresponds engagement by the shaft 2 for selection and engagement of the gear change 3, of one of the two gears in the row, or of the neutral position.

The control unit 1 additionally comprises a cam-guide device 8, which is mobile on the control shaft 6, between a plurality of row-change positions, at each of which, as will be described in greater detail hereinafter, it can guide the control shaft 6 in combined axial and angular displacement which is sufficient to transform the passage of gear between two gears which belong to a single row, into a passage of gear between two consecutive gears which belong to two consecutive rows.

As an alternative to transforming the angular displacement of the control shaft 6 into combined axial and angular displacement, the cam-guide device 8 can use selectively the angular displacement of the control shaft 6 during the passage of gear between two consecutive gears in a single row, in order, as will be described in greater detail hereinafter, to implement its own displacement along the control shaft 6, from one row-change position to the adjacent position, such as to be ready to carry out a successive change of row.

With reference to FIG. 4, in the example illustrated the movement device 7 comprises a control arm 10, which extends radially from the control shaft 6, and a linear actuator 11 with three positions, which is connected mechanically to the free end 10a of the arm 10, such as to be able to displace the arm 10 along a plane which is perpendicular to the axis A, so as to be able to rotate the control shaft 6 around the axis A, between three different angular positions, to each of which there corresponds engagement of a gear in the row, or of the neutral position.

In the example illustrated, the linear actuator 11 with three positions consists of a double-effect piston 12, which is fitted such as to slide axially inside a cylindrical cavity, which extends inside the housing 5, perpendicularly to the control shaft 6. In particular, the cylindrical cavity is provided in the housing 5, adjacent to the control shaft 6, whereas the free end of the arm 10 engages in a sliding manner a seat 13 provided in the body of the piston 12.

Inside the cylindrical cavity, the piston 12 defines two chambers with a variable volume which are complementary to one another, and can be filled, alternately or simultaneously, with a pressurised fluid, such as to be able to move the piston 12 inside the cylindrical cavity itself, between three different positions, to each of which there corresponds engagement of one gear in the row, or of the neutral position. In this case, when the two chambers with a variable volume are filled simultaneously, it is possible to place the piston 12, inside the cylindrical cavity, in a central position which corresponds to selection of the neutral position; whereas when only one of the two chambers with a variable volume is filled, it is possible to place the piston 12 such that it abuts one of the two end walls of the cylindrical cavity, which corresponds to selection of the lower or higher gear in the row.

It will be appreciated that the double-effect piston 12 can optionally be replaced by a linear actuator of another type with three positions, or by a rotary actuator which is keyed directly onto the control shaft 6, such as a step-by-step electric motor.

On the other hand, with reference to FIGS. 2, 3 and 4, in the example illustrated, the cam-guide device 8 comprises a cylindrical cam 20, which is keyed such as to slide inside the housing 5, on the control shaft 6, with the possibility of axial displacements alone, and a locking device 21, which can prevent selectively any axial displacement of the cylindrical cam 20 relative to the housing 5.

The cylindrical cam 20 extends coaxially relative to the axis A, has a substantially cylindrical shape, and, in diametrically opposite positions, has two grooves 22 with a profile in the shape of an "S", which can be engaged in a sliding manner by two guide pins 23, which extend radially from the control shaft 6. The two grooves 22 with a profile in the shape of an "S" are symmetrical relative to one another, and are produced such that the distance between the two planes of the profile in the shape of an "S", which are substantially perpendicular relative to the axis A, corresponds to the distance d which exists between two successive rows, i.e. it is equivalent to the axial displacement which must be imparted to the shaft 2 for selection and engagement of the gears, in order to implement a passage of row.

In the example illustrated, in order to guarantee the possibility of axial displacements alone, on the outer lateral surface 20 of the cylindrical cam 20, there is present a longitudinal levelling, which can co-operate with a corresponding flat portion of the wall of the carcass 5, such as to prevent any rotation of the cylindrical cam 20 around the axis A.

On the other hand the locking device 21 consists of a simplified linear actuator 24 with two positions, which is fitted integrally inside the housing 5, such as to have its own output shaft 24a facing the outer lateral surface 20a of the cylindrical cam 20 itself. This output shaft 24a is mobile by command from and towards an extracted position, in which the end of the output shaft 24a is disposed on the outer lateral surface 20a of the cylindrical cam 20, such as to prevent any axial displacement.

In this case, on the outer lateral surface 20a of the cylindrical cam 20, in a position diametrically opposite the longitudinal levelling, i.e. at the linear actuator 24, there are provided transverse grooves 25, of a number equivalent to the number of rows in the gear change 3. These grooves 25 are aligned one above another, in a direction which is parallel to the axis A of the control shaft 6, and are spaced from one another by a distance d which is equivalent to the distance which exists between two successive rows in the gear change 3. The end of the control shaft 24a can engage any of these grooves 25 selectively, such as to prevent any axial displacement of the cylindrical cam 20 inside the housing 6.

It should be emphasised that, in the example illustrated, the linear actuator 24 is an electrically-operated linear actuator, but it could also be a single-effect hydraulic piston.

Finally, with reference to FIGS. 2, 3 and 4, the control unit 1 is preferably, but not necessarily, provided with a resilient device 26 for retention of the control shaft 6, which can prevent undesirable axial displacements of the control shaft 6 inside the housing 5, caused by vibrations or by the weight of the control shaft 6 itself. In the example illustrated, this retention device 26 consists of a cup-type body 27, which is disposed with its open end facing the control shaft 6, a strut 28, which is fitted such as to be axially mobile inside the cup-type body, and finally a helical spring (not shown), which is disposed on the base of the cup-type body 27, such as to thrust the strut 28 against the surface of the control shaft 5, in which recesses 29 are provided. These recesses 29 are aligned in a direction which is parallel to the axis A of the control shaft 6, are of a number equivalent to the number of rows in the gear change 3, and are spaced from one another by a distance d, which is equivalent to the distance which exists between two successive rows in the gear change 3.

The functioning of the control unit 1 of the shaft 2 for selection and engagement of the gears of the mechanical gear change 3 will now be described, on the assumption that the cylindrical cam 20 is at a standstill in any row-change position.

In the case of a change of gear between two consecutive gears which belong to consecutive rows, the selection takes place by actuating the locking device 21, such as to lock the cylindrical cam 20, and then, by means of the movement device 7, imparting to the control shaft 6 the angular displacement which is necessary in order to pass, within the row, from one gear to another in the row. During the angular displacement of the control shaft 6, since the cylindrical cam 20 cannot be translated axially, it imparts to the control shaft 6 itself also axial thrust, which, when combined with the angular thrust, implements the passage of gear between two consecutive gears which belong to two consecutive rows, passing via the neutral position.

In the case of a change of gear between consecutive gears which belong to the same row, the selection is carried out by de-activating the locking device 21, such as to permit axial displacements of the cylindrical cam 20, and then, by means of the movement device 7, imparting predetermined angular displacement to the control shaft 6, such as to pass from one gear to another within the row, via the neutral position.

During rotation of the control shaft 6, since the cylindrical cam 20 cannot rotate together with the control shaft 6 itself, it is displaced axially, guided by the grooves 22, by an extent which is equivalent to the distance d between two planes of the profile in the shape of an "S", i.e. to the distance which exists between two successive rows. In other words, the cylindrical cam 20 is displaced axially along the control shaft 6, from one row-change position to the next, at which, if required, the cylindrical cam 20 is ready to guide the successive passage to a row adjacent to the row inside which the present passage of gear is taking place.

In substance therefore, during the changes of gear within a single row, the cylindrical cam 20 is displaced in steps on the control shaft 6, between the various row-change positions, such as, on each occasion, to be positioned in the row-change position which is suitable for implementing the passage to the row adjacent to the existing row, and is self-centred in this position.

Since the foregoing description applies both to passage to a higher gear and to passage to a lower gear, it is apparent that the control unit 1 implements sequential engagement of the gears.

The control unit 1 for the shaft 2 for selection and engagement of the gears which is described and illustrated above has many advantages: there is elimination of the linear selection actuator with three or more positions, which is replaced by the cam-guide device 8, which is far more simple and economical to produce. The cylindrical cam 20 with grooves 22 in the shape of an "S" is in fact relatively easy to produce, and has production costs which are substantially reduced, whereas the linear actuator 24 can be of the electromagnetic type instead of the hydraulic type, with obvious simplification of the piloting circuit itself.

A further advantage of the control unit 1 consists in the fact that the cam-guide device 8 does not require regulation in order to recover the fitting play, and is not affect by the play relative to the individual positions assumed by the control shaft 6 during selection of the gears. In fact, the cylindrical cam 20 is self-centred after each axial displacement along the control shaft 6.

Finally, it is apparent that modifications and variants can be made to the control unit 1 described and illustrated here, without departing from the context of the present invention.

What is claimed is:

1. Unit (1) for controlling a shaft (2) for selection and engagement of gears of a gear change (3), wherein the shaft (2) for selection and engagement of the gears is mobile, after axial displacements and/or rotations have taken place, between a plurality of gear engagement positions, to each of which there corresponds engagement of a gear or of a neutral position; the positions of engagement of the gear being disposed according to a selection grid in the shape of an "H" in which the gears are distributed in rows of two; the control unit (1) comprising:

an outer housing (5);

a control shaft (6) which is fitted on the said housing (5), such as to be able to rotate angularly around its own axis (A), in order to implement a maneuver of engagement or release of the gears, and is axially mobile along its own axis (A), in order to implement a maneuver of selection of a row of gears; for each row of gears the said control shaft (6) also being able to assume three different angular positions, corresponding respectively to a neutral angular position and two angular positions for engagement of the gear;

movement means (7), which are designed to displace the said control shaft (6) angularly around its own longitudinal axis (A), between the said three different angular positions; and cam guide means (8), which are connected mechanically to the said control shaft (6), and which, during the angular displacement of the control shaft (6) which implements the passage between the two angular positions of engagement of gears in a row, are designed to impart selectively to the control shaft (6) itself axial displacement which is sufficient to implement passage to the row which is immediately adjacent, such as to implement the passage between consecutive gears which belong to consecutive rows;

the control unit (1) being characterised in that the said cam guide means (8) are axially mobile along the control shaft (6), between a plurality of row-change positions, at each of which it can guide the control shaft (6) in combined angular and axial displacement, which is sufficient to transform the passage of gear between two gears which belong to a single row, into a passage of gear between two consecutive gears which belong to two consecutive rows.

2. Control unit according to claim 1, characterised in that the said cam guide means (8) are also able selectively to use the angular displacement of the control shaft (6) during the passage of gear between two consecutive gears in a single row, in order to implement its own displacement along the control shaft (6), from one row-change position to the one which is adjacent, such as to be ready to implement a successive change of row.

3. Control unit according to claim 2, characterised in that the said cam guide means (8) comprise a cylindrical cam (20), which is keyed such as to slide inside the housing (5), with the possibility of axial displacements alone, and locking means (21), which can prevent selectively any axial displacement of the cylindrical cam (20) relative to the housing (5).

4. Control unit according to claim 3, characterised in that the said control shaft (6) is provided with at least one guide pin (23), which extends radially from the control shaft (6) itself, and the said cylindrical cam (20) is provided with at least one groove (22) with a profile in the shape of an "S", which can be engaged in a sliding manner by the said guide pin (23), the said groove (22) with a profile in the shape of an "S" being produced such that the distance (d) between the two planes of the profile in the shape of an "S" is equivalent to the axial displacement which must be imparted to the shaft (2) for selection and engagement of the gears, in order to implement a passage of row.

5. Control unit according to claim 4, characterised in that the said locking means (21) comprise a linear actuator (24), which is fitted integrally inside the housing (5), such as to have its own output shaft (24a) facing the outer lateral surface (20a) of the said cylindrical cam (20); the said output shaft (24a) being mobile by command from and towards an extracted position, in which the end of the output shaft (24a) abuts the outer lateral surface (20a) of the cylindrical cam (20), such as to prevent any axial displacement.

6. Control unit according to claim 5, characterised in that on its outer lateral surface (20a), the said cylindrical cam (20) has a plurality of transverse grooves (25), of a number equivalent to the number of rows in the gear change (3); the said transverse grooves (25) being aligned one above another, in a direction which is parallel to the longitudinal axis (A) of the control shaft (6), and being spaced from one another by a distance (d) which is equivalent to the distance which exists between two successive rows in the gear change (3); the end of an output shaft (24a) of the said linear actuator (24) being able to engage any of these transverse grooves (25) selectively, such as to prevent any axial displacement of the cylindrical cam (20) inside the housing (6).

7. Control unit according to claim 1, characterised in that the said movement means (7) comprise a control arm (10), which extends radially from the control shaft (6), and a linear actuator (11) with three positions, which is connected mechanically to a free end (10a) of the arm (10), such as to be able to displace the arm (10) itself along a plane which is perpendicular to the longitudinal axis (A), so as to be able to rotate the control shaft (6) around the longitudinal axis (A) itself, between the said three different angular positions, to each of which there corresponds engagement of a gear in the row, or of the neutral position.

8. Control unit according to claim 1 characterised in that it comprises resilient means (26) for retention of the control shaft (6), which can prevent undesirable axial displacements of the control shaft (6) inside the housing (5).

* * * * *